(12) United States Patent
Fan et al.

(10) Patent No.: US 11,953,639 B2
(45) Date of Patent: Apr. 9, 2024

(54) CROSS-COMPONENT RESPONSE INTERPOLATION FOR COAXIALLY ORIENTED ANTENNAS IN AN ELECTROMAGNETIC TOOL

(71) Applicant: Halliburton Energy Services, Inc., Houston, TX (US)

(72) Inventors: Yijing Fan, Singapore (SG); Hsu-Hsiang Wu, Sugarland, TX (US); Jin Ma, Houston, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/697,712

(22) Filed: Mar. 17, 2022

(65) Prior Publication Data
US 2023/0296802 A1 Sep. 21, 2023

(51) Int. Cl.
*G01V 1/52* (2006.01)
*G01V 1/22* (2006.01)
*G01V 13/00* (2006.01)

(52) U.S. Cl.
CPC .............. *G01V 1/52* (2013.01); *G01V 1/22* (2013.01); *G01V 13/00* (2013.01)

(58) Field of Classification Search
None
See application file for complete search history.

(56) References Cited

U.S. PATENT DOCUMENTS

| | | | | |
|---|---|---|---|---|
| 3,808,520 A * | 4/1974 | Runge | ...................... | G01V 3/28 324/343 |
| 5,574,374 A * | 11/1996 | Thompson | ............... | G01V 3/28 702/9 |
| 7,414,391 B2 * | 8/2008 | Homan | ................... | G01V 13/00 324/225 |
| 9,547,102 B2 * | 1/2017 | Wu | ........................... | G01V 3/38 |
| 10,156,655 B2 * | 12/2018 | Morris | ..................... | G01V 3/38 |
| 10,358,911 B2 * | 7/2019 | Wu | ........................... | G01V 3/28 |
| 10,942,288 B2 * | 3/2021 | Ma | ........................... | G01V 1/50 |
| 11,112,523 B2 * | 9/2021 | Frey | ........................ | G01V 3/26 |
| 11,326,446 B2 * | 5/2022 | Hensarling | ............. | E21B 49/08 |
| 11,339,650 B2 * | 5/2022 | Bittar | ........................ | G01V 3/10 |
| 2001/0004212 A1 * | 6/2001 | Omeragic | .............. | H01Q 1/526 324/338 |
| 2004/0113609 A1 * | 6/2004 | Homan | .................. | G01V 13/00 324/202 |
| 2008/0258733 A1 * | 10/2008 | Bittar | ........................ | G01V 3/28 175/45 |

(Continued)

*Primary Examiner* — Isam A Alsomiri
*Assistant Examiner* — Jonathan D Armstrong
(74) *Attorney, Agent, or Firm* — DeLizio, Peacock, Lewin & Guerra, LLP

(57) ABSTRACT

Some aspects relate to techniques for calibrating a logging tool. In some implementations, the logging tool may estimate certain unknown properties of a signal based on distances between transmitters and receivers of the logging tool and based on frequencies used by the transmitters and receivers. The logging tool may estimate the unknown properties by interpolating values into a mathematical function related to the above-noted distances and frequencies. After estimating the unknown properties, the logging tool may be deployed into the wellbore, where it may use the estimated properties to process signals received through a subsurface formation.

17 Claims, 8 Drawing Sheets

(56) References Cited

U.S. PATENT DOCUMENTS

| | | | |
|---|---|---|---|
| 2008/0278169 A1* | 11/2008 | Bittar | G01V 3/28 324/333 |
| 2009/0224764 A1* | 9/2009 | Bittar | G01V 3/28 324/338 |
| 2010/0123462 A1* | 5/2010 | Bittar | G01V 3/28 324/369 |
| 2011/0199088 A1* | 8/2011 | Bittar | G01V 3/28 702/7 |
| 2015/0241596 A1* | 8/2015 | Donderici | G01V 13/00 324/338 |
| 2015/0322774 A1* | 11/2015 | Wu | G01B 7/004 702/7 |
| 2015/0369950 A1* | 12/2015 | Wu | G01V 3/30 702/7 |
| 2017/0261633 A1* | 9/2017 | Morris | G01V 3/30 |
| 2017/0261635 A1* | 9/2017 | Morris | G01V 3/30 |
| 2017/0261636 A1* | 9/2017 | Morris | G01V 3/28 |
| 2019/0079210 A1* | 3/2019 | Ma | E21B 47/00 |
| 2019/0137646 A1* | 5/2019 | Frey | G01V 3/12 |
| 2020/0091608 A1* | 3/2020 | Alpman | H04B 7/0639 |
| 2020/0300084 A1* | 9/2020 | Bittar | G05B 15/02 |
| 2020/0300085 A1* | 9/2020 | Hensarling | G01V 3/10 |
| 2022/0137251 A1* | 5/2022 | Pan | G01V 3/30 702/7 |
| 2023/0057184 A1* | 2/2023 | Pan | G01V 1/50 |

* cited by examiner

| Channel | ZZ_Air | XX_Air |
|---|---|---|
| 142"125KHz | -1.633357175464467e-09-7.457796866996911e-09i | 8.147102224535325e-10+3.727217933030089e-09i |
| 134"125KHz | -1.939333032232740e-09-8.859110249784405e-09i | 9.684783676725961e-10+4.428527550215951e-09i |
| 142"250KHz | -2.016070155430620e-09-1.449560484065390e-08i | 9.820782445693840e-10+7.188049159346050e-09i |
| 134"250KHz | -2.378766203480500e-09-1.719639508544630e-08i | 1.174596596519500e-09+8.561454914553700e-09i |
| 52"500KHz | -5.363462649813960e-08-5.523951359095610e-07i | 2.668971350186040e-08+2.760593040904390e-07i |
| 44"500KHz | -8.590906653463300e-08-8.881704791148890e-07i | 4.285046734653670e-08+4.439709608851120e-07i |
| 52"2MHz | -2.806072088994070e-07-2.183573881317270e-06i | 1.364925511005930e-07+1.082758318682730e-06i |
| 28"500KHz | -3.026939511544790e-07-3.206012147063060e-06i | 1.506087288455210e-07+1.602201852936940e-06i |
| 44"2MHz | -4.655349960093400e-07-3.503841250191070e-06i | 2.297970639906600e-07+1.744423549808930e-06i |
| 20"500KHz | -7.879074136841630e-07-8.415539409073870e-06i | 3.929712863158370e-07+4.206684190926130e-06i |
| 28"2MHz | -1.672993323193370e-06-1.266546671243010e-05i | 8.141966768066310e-07+6.280418487569920e-06i |
| 20"2MHz | -4.331107643994840e-06-3.320413505985900e-05i | 2.137582756005160e-06+1.653097694014100e-05i |

FIG. 2

CROSS-COMPONENT RESPONSE INTERPOLATION FOR COAXIALLY ORIENTED ANTENNAS IN AN ELECTROMAGNETIC TOOL

TECHNICAL FIELD

The disclosure generally relates to the field of wellbore logging tools and, more specifically, to a calibration method for a resistivity logging tool with a coaxial transmitter.

BACKGROUND

In order to measure various electrical properties (e.g., resistivity, relative permittivity, etc.) and therefore determine various material properties (i.e., lithology, boundary location(s), etc.) in a subsurface formation, a logging tool may emit electromagnetic radiation from at least one transmitter antenna and measure corresponding signals received at least one receiver antenna. Various parameters of the received signals are altered by the material through which the signals pass. To determine the various material properties, the measured signals are compared to calibrated or idealized response signals. The calibrated response signals (also known as "air-hang" response signals) can be generated for the tool by measuring signals that have been transmitted through homogeneous air.

BRIEF DESCRIPTION OF THE DRAWINGS

Aspects of the disclosure may be better understood by referencing the accompanying drawings.

FIG. 2 depicts a tabular representation of channels and their associated multi-tensor components in air, according to some embodiments.

DESCRIPTION

The description that follows includes example systems, methods, techniques, and program flows that embody aspects of the disclosure. However, it is understood that this disclosure may be practiced without these specific details. For instance, this disclosure refers to a coaxial transmitter in illustrative examples. Aspects of this disclosure can be also applied to coaxial receivers or other coaxial antennas. In other instances, well-known instruction instances, protocols, structures and techniques have not been shown in detail in order not to obfuscate the description.

A well-logging tool ("logging tool") may be deployed in a wellbore to gather information about a geological formation. In some instances, the logging tool may include transmitters and receivers that transmit and measure signals through the formation. Based on the measurements, the logging tool may determine various properties about the formation and make decisions about future well-related operations.

Some logging tools may require calibration before being deployed into the wellbore. For example, the logging tool may transmit signals and take test measurements while suspended in air, where those measurements may be compared to known test values to determine an error value for future measurements. The logging tool also may use the through-air test measurements to derive information that will be needed to process signals received through geological formations (as opposed to through air). However, some transmitter configurations are not amenable to traditional calibration processes. For example, when a coaxial transmitter (i.e., a transmitter with no tilt-angle) transmits signals through air during calibration, the signals may lack certain measurable properties. As a result, the logging tool may not be able to derive, during the calibration process, information that will be needed later for processing signals received through a geological formation.

Some implementations may overcome this challenge by estimating information that could not be derived during the calibration process. In some implementations, the logging tool may estimate certain unknown properties of a signal based on distances between transmitters and receivers of the logging tool and based on frequencies used by the transmitters and receivers. The logging tool may estimate the unknown properties by interpolating values into a mathematical function related to the above-noted distances and frequencies. After estimating the unknown properties, the logging tool may be deployed into the wellbore, where it may use the estimated properties to process signals received through a subsurface formation.

Example Logging Tool

Figure 1A:
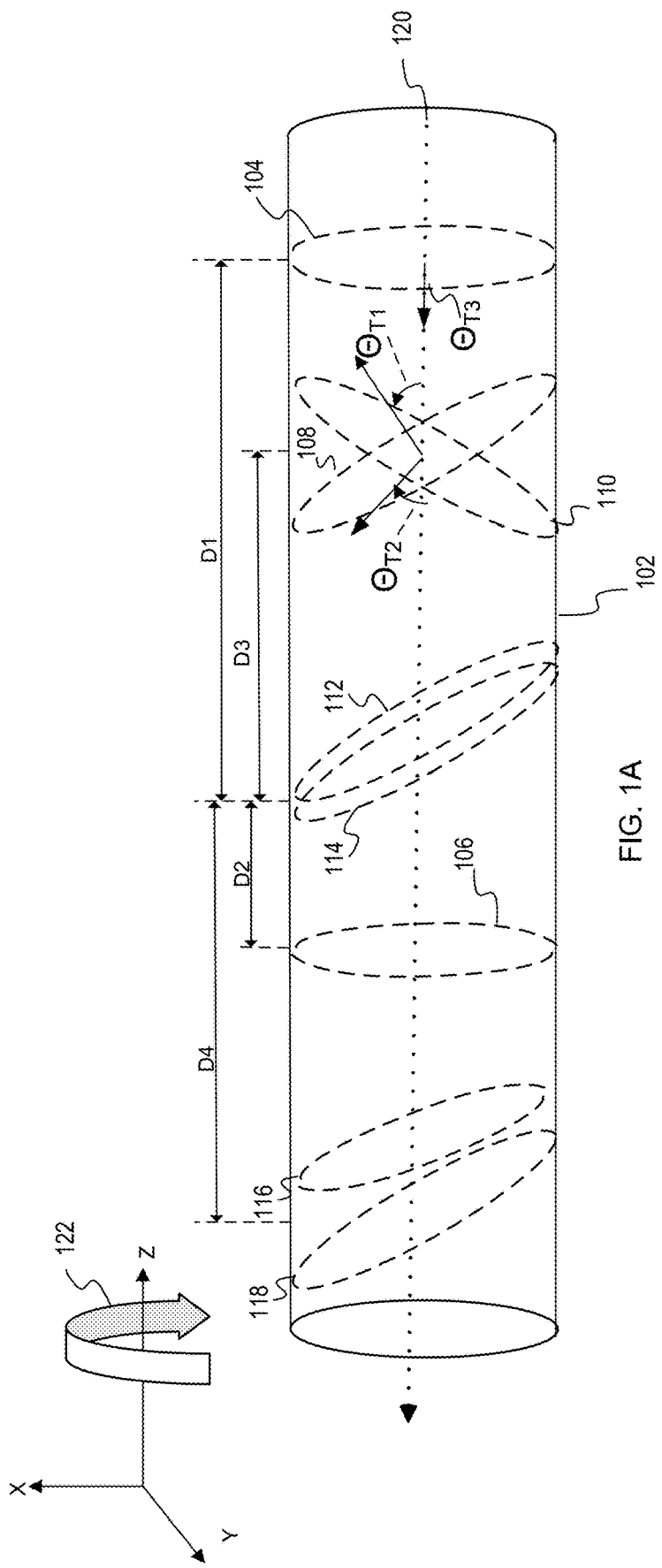
FIGS. 1A-B depict an example logging tool, according to some embodiments.

FIG. 1A is a diagrammatic illustration of an example logging tool. The logging tool 102 may be deployed in a wellbore to obtain information about a subsurface formation, to inform operations related to geosteering, or to perform other operations. As shown, the logging tool 102 may include a first coaxial transmitter 104 and a second coaxial transmitter 106. The logging tool 102 also may include co-located transmitters 108 and 110, dual transmitters 112 and 114, and medium transmitters 116 and 118. Each transmitter/receiver may be disposed at a respective tilt-angle θ. For example, the co-located transmitter 108 may have a tilt-angle θt1, where θt1 is an angle between a longitudinal axis 120 of the logging tool 102 and a normal vector of a plane of the co-located transmitter 108. In some implementations, the co-located transmitter 108 may have a tilt-angle θt2 equal to −θt1. The first coaxial transmitter 104 may have a tilt-angle of zero—i.e., θt3 may be zero. The second coaxial transmitter 106 also may have a tilt-angle of zero. The first coaxial transmitter 104 may be coaxially aligned along the longitudinal axis 120 with the second coaxial transmitter 106.

Although the logging tool 102 is depicted in an example arrangement with multiple transmitters and receivers, the logging tool 102 may have more or fewer transmitters and receivers than depicted and/or and they may in different arrangements or orientations than depicted. In some implementations, the transmitters may also be capable of acting as receivers. The receivers also may be capable of acting as transmitters. Each of the transmitters may include a transmitter antenna and each receiver may include a receiver antenna. The transmitters and receivers of the logging tool 102 are depicted as including loop antennas, which may be integrated into the body of the logging tool 102 or applied to an outer surface of the logging tool 102. In some implementations, the antennas may include dipole antennas, aperture antennas, etc.

For reference, FIG. 1A depicts a set of orthonormal axes (x-axis, y-axis, and z-axis), where the z-axis is parallel to the longitudinal axis of the logging tool 102. The z-axis is shown as pointing left-and-right. However, the axes may be transformed to comply with the right-hand rule or may be otherwise transformed.

Figure 1B:
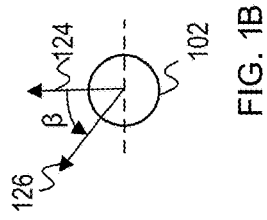

The logging tool 102 may azimuthally rotate 122 about the longitudinal axis 120. β may be an angle of a tool face relative to a high-side of the logging tool 102. As shown in FIG. 1B, β may be the angle between a normal vector of the high-side 124 and a normal vector of the tool face 126. As the logging tool 102 rotates, the transmitters and receivers may have respective orientations relative to the high-side of the logging tool 102. Hence, as the logging tool 102 rotates, β may reflect the above-noted angle at an instant in time. β may be sampled into any suitable number of bins.

In FIG. 1A, the first coaxial transmitter 104 may be separated from the dual transmitters 112 and 114 by a first distance D1. The second coaxial transmitter 106 is separated from the dual transmitters 112 and 114 by a second distance D2. The co-located transmitters 108 and 110 are separated from the dual transmitters 112 and 114 by a third distance D3. The dual transmitters 112 and 114 are separated from the medium transmitters 116 and 118 by a fourth distance D4. In some implementations, the logging tool 102 may use one or more of the distances along with channel frequencies to estimate a property of a signal received through a formation (as described in more detail herein).

The logging tool 102 may be conveyed through a borehole and become surrounded by a formation. The borehole may create an annular space surrounding the logging tool 102, where a radius may be regular or irregular, and may comprise a distribution of various radius values. The annular space may, for example, be cylindrical, a rectangular prism, cuboid, etc. The annular space can be filed with an annular fluid, where the annular fluid can be air or another gas, or water, saltwater, water-based drilling mud, oil-based drilling mud, oil, etc. The annular space can comprise multiple layers, such as liner, casing, cement, etc., including multiple fluid or mud layers, such as uncased wellbore, mud filtrate, mud cake, etc. The logging tool 102 may be centered in the annular space, such that the logging tool 102 is coaxial with a longitudinal axis of the annular space. The logging tool 102 may also be off-center in the annular space, so the logging tool 102 is closer to one face or side of the annular space than another.

Generally, for the logging tool 102, a response measured at a receiver corresponding to a signal transmitted by a transmitter can be expressed as a multi-component tensor.

$$\begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \quad (1)$$

In some implementations, each component ($Z_{ij}$) of the multi-component tensor may represent a complex amplitude (i.e., a complex number representing an amplitude) of a signal measured by the logging tool 102. A more specific example response of the logging tool 102 may be represented using Equations 2 and 3. However, some implementations of the logging tool 102 may utilize other suitable tool responses. The example tool response in Equations 2 and 3 is offered to demonstrate that some tool responses may be incapable of measuring certain signal properties (such as the multi-tensor component $Z_{xx}$) for certain transmitter/receiver configurations of the logging tool 102 (e.g., a coaxial transmitter and any receiver) (more detail given below). Assuming a one-dimensional, stratified formation, an example tool response of the logging tool 102 may be expressed as:

$$Z_{TR1}(\beta) = \begin{bmatrix} \sin\theta_t\cos\beta \\ \sin\theta_t\sin\beta \\ \cos\theta_t \end{bmatrix}^T \begin{bmatrix} Z_{xx} & 0 & Z_{zx} \\ 0 & Z_{yy} & 0 \\ Z_{xz} & 0 & Z_{zz} \end{bmatrix} \begin{bmatrix} \sin\theta_r\cos(\beta + \beta_{TR1}) \\ \sin\theta_r\cos(\beta + \beta_{TR1}) \\ \cos\theta_r \end{bmatrix} \quad (2)$$

$$Z_{TR2}(\beta) = \begin{bmatrix} \sin\theta_t\cos\beta \\ \sin\theta_t\sin\beta \\ \cos\theta_t \end{bmatrix}^T \begin{bmatrix} Z_{xx} & 0 & Z_{zx} \\ 0 & Z_{yy} & 0 \\ Z_{xz} & 0 & Z_{zz} \end{bmatrix} \begin{bmatrix} \sin\theta_r\cos(\beta + \beta_{TR2}) \\ \sin\theta_r\cos(\beta + \beta_{TR2}) \\ \cos\theta_r \end{bmatrix} \quad (3)$$

where TR1 indicates a first transmitter and receiver pair, and where TR2 indicates a second transmitter and receiver pair. As noted, β is azimuthal rotation of the tool about the longitudinal axis 120. $\theta_t$ is an angle by which the transmitter is tilted with respect to the tool, and $\theta_r$ is the angle by which the receiver is tilted with respect to the tool. Z may be the multi-component tensor represented in Equation 1, where certain components have a value of zero. Z may represent the cross-component response factors $Z_{ij}$ (where i=x, y, z and j=x, y, z) and may be dependent on the transmitter angle $\theta_t$, the receiver angle $\theta_r$, and the tool face angle β. $\beta_{TR1}$ may be the tool face angle difference between the first transmitter and first receiver and $\beta_{TR2}$ may be the tool face angle difference between the second transmitter and the second receiver. $\beta_{TR1}$ and $\beta_{TR2}$ may be a function of antenna orientation and are not changed by longitudinal rotation of the tool.

For an air-hang measurement, the logging tool 102 may be operated in air—for example in a laboratory, factory setting, or at the surface of a drilling site—which may or may not be at standard temperature and pressure (STP). An air-hang measurement can therefore be represented by the logging tool 102 in the annular space where the annular fluid is air, such that the impact of a test formation on the air-hang measurement is zero or negligible. In some implementations, when calibrating the logging tool 102 in homogeneous air, there is no measurable $Z_{zx}$ or $Z_{xz}$ cross-component response for signals received through the homogeneous air. In such case, the cross-component response may be estimated by determining $Z_{xx}$ and $Z_{zz}$ for signals received through homogeneous air and using Equation 4 to estimating $Z_{xzAir}$:

$$Z_{xzAir} = \sqrt{Z_{xxAir}Z_{zzAir}} \quad (4)$$

However, a coaxial transmitter (such as the first coaxial transmitter 104) may not generate a measurable $Z_{xxAir}$ Air component. As noted, the first coaxial transmitter 104 may have a tilt angle of zero degrees (i.e., $\theta_{t3}$ may be zero). Referring to the example tool response of Equations 2 and 3, many terms may become zero when the transmitter tilt angle is zero degrees. For example, all sin θt terms are zero, so the $Z_{xx}$ becomes zero for the air-hang signal measurements. Without the $Z_{xx}$ term, the logging tool 102 cannot use Equation 4 to estimate $Z_{xxAir}$. Hence, the logging tool 102 may estimate $Z_{xx}$ using an interpolation process based on distances between the transmitters and receivers and based on frequencies used by the transmitters and receivers. Even if the tool response differs from Equations 2 and 3, $Z_{xxAir}$ may remain an immeasurable component of the signal. In such case, the logging tool 102 may estimate $Z_{xxAir}$ using the techniques described herein.

The logging tool 102 may estimate a $Z_{xx}$ component based, at least in part, on various $Z_{xx}$ response components of signals transmitted by the co-located transmitters 108 and 110 and received by the co-located receivers 108 and 110. For each transmitter and receiver pair, a channel may have a spacing (i.e., the distance between the transmitter and the receiver of the transmitter and receiver pair) and a frequency (i.e., the frequency at which the transmitter transmits the signal which is measured at the receiver). Different channels may be formed by a transmitter and receiver pair as the pair may use different frequencies (even though the spacing does not change). A transmitter can be included in a transmitter and receiver pair with any receiver of the tool, and likewise a receiver can be included in a transmitter and receiver pair with any transmitter of the tool. As noted, any transmitter may operate as a receiver and vice versa. For transmitters/receivers that switch between transmitting and receiving, $Z_{xx}$ components may be similarly estimated per the techniques described herein.

For a set of channels of the logging tool 102, there may be a linear function for which the domain is a scaling factor and the range is an amplitude, where each resulting amplitude in the range may be used as an estimation of $Z_{xxAir}$. An example scaling factor may be represented in Equation 5:

$$\text{Scaling Factor} = \frac{f}{d^3} \qquad (5)$$

where f is the operating frequency of the channel in hertz (Hz) and d is the spacing of the transmitter and receiver pair for the channel in inches. Hence, using interpolation via the above-noted linear function, the logging tool 102 may estimate $Z_{xxAir}$ based on a particular value of the scaling factor f/d³. The logging tool 102 may use the estimate for $Z_{xxAir}$ to determine $Z_{xzAir}$ and $Z_{zxAir}$, such as by using Equation 4. The logging tool 102 also may perform additional operations for calibrating itself before being deployed into a wellbore.

FIG. 2 depicts a tabular representation of channels and their associated multi-tensor components in air, according to some embodiments. In the table 200, a left column includes channels that may be associated with an example implementation of the logging tool 102. The central column includes a first complex amplitude (i. e., $Z_{zzAir}$) associated with each channel. The right column includes a second complex amplitude (i. e., $Z_{xxAir}$) associated with each channel. In some implementations, the logging tool 102 may determine a scaling factor for each channel using Equation 5 and based on the channel distance and frequency shown in the left column of the table 200. The logging tool 102 may determine a linear function whose domain includes the scaling factor of each channel in the table 200 and whose range includes the respective values of $Z_{zzAir}$. The logging tool 102 also may determine a linear function whose domain includes the scaling factor for each channel in the table 200 and whose range includes the respective values of $Z_{xxAir}$.

The logging tool 102 may use the linear functions to interpolate any value of $Z_{xxAir}$ or $Z_{zzAir}$ for any channel, given the scaling factor—which may be determined from the frequency and distance of the channel.

Figure 3:
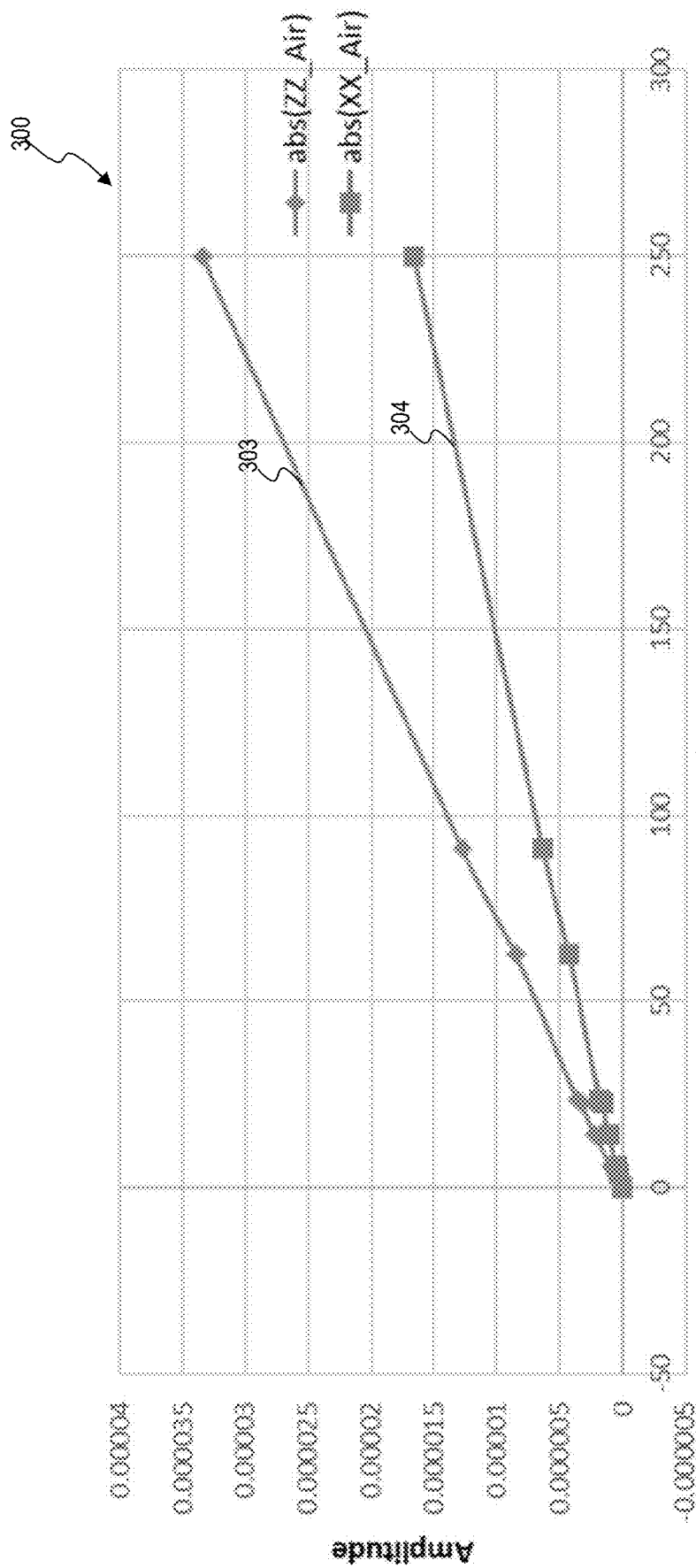
FIG. 3 depicts a graph illustrating linear relationships between scaling factor and signal amplitude, according to some embodiments.

FIG. 3 depicts a graph illustrating linear relationships between scaling factor and signal amplitude, according to some embodiments. In the graph 300, a horizontal axis represents increasing scaling factor, where the scaling factor is computed per Equation 5. The vertical axis represents increasing amplitude of a signal as simulated according to a given tool response. The linear curve 303 has been fit to a set of amplitudes $Z_{zzAir}$, where each amplitude $Z_{zzAir}$ is associated with a respective scaling factor f/d³. The linear curve 304 has been fit to a set of amplitudes $Z_{zzAir}$, where each amplitude $Z_{zzAir}$ is associated with a respective scaling factor f/d³. The linear curves 303 and 304 may coincide with the above-noted linear functions over a given range of scaling factors.

In some implementations, the logging tool may determine scaling factors differently than Equation 5. A scaling factor may be selected based on the linearity of the relationship between the scaling factor and the absolute amplitude or phase of the $Z_{xxAir}$ component and, optionally, the $Z_{zzAir}$ component. Scaling factors may be different for different tool bodies, where the scaling factor may depend on antenna separation, antenna type (such as number of coils, strength, material, etc.), tool body parameters (such as diameter, dielectric coefficient, etc.) and other parameters. In some implementations, the logging tool 102 may use a generalized scaling factor represented in Equation 6:

$$\text{Scaling Factor} = g(f,d) = A * f^b d^c \qquad (6)$$

where the scaling factor may be a function g of the frequency f and the spacing d between the transmitter and receiver pair, A may be a fitting coefficient, b may be a generalized fitting exponent for the frequency f, and c may be a generalized fitting exponent for the spacing d.

Example Operations

Figure 4:
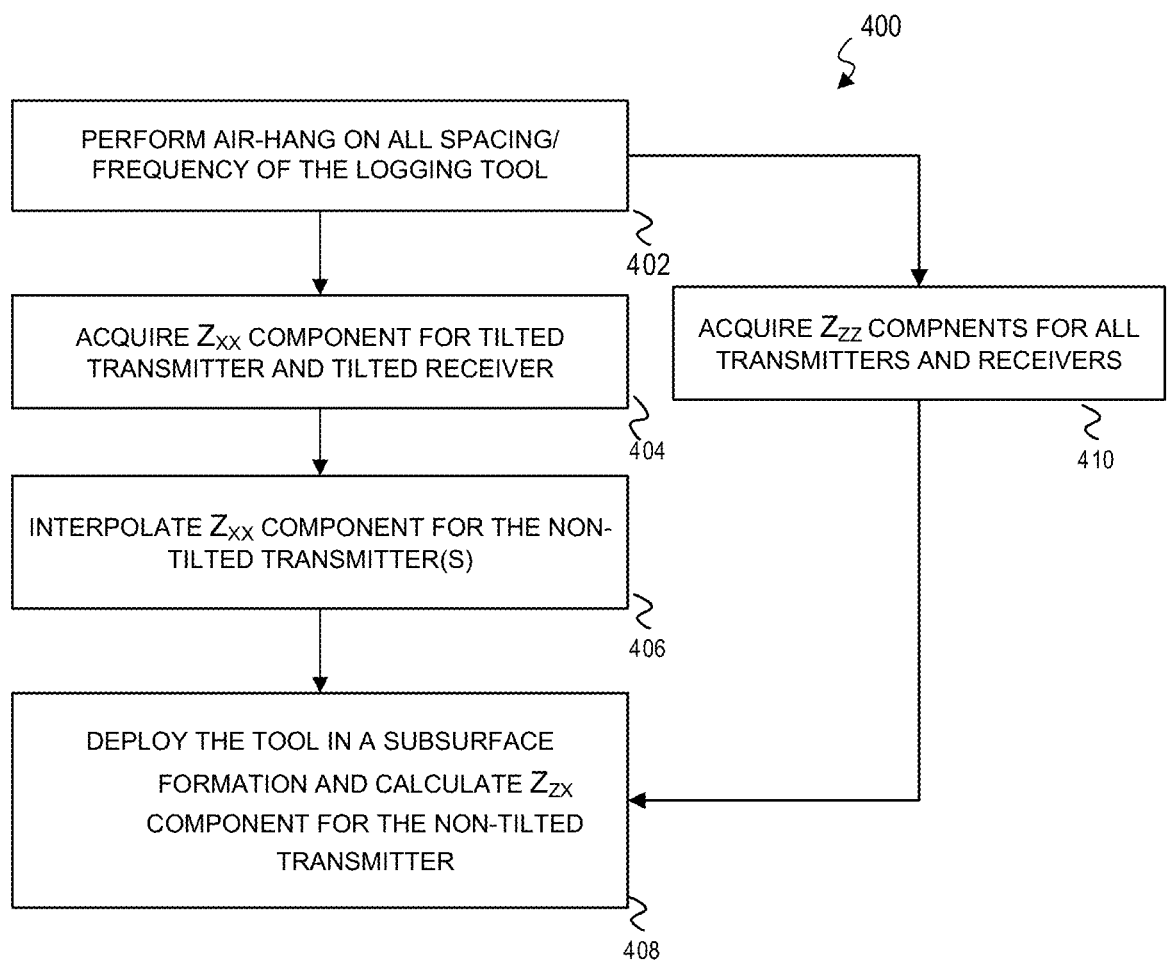
FIG. 4 depicts a flowchart illustrating operations for estimating a multi-tensor component for a logging tool during a calibration process, according to some embodiments.

FIG. 4 depicts a flowchart illustrating operations for estimating a multi-tensor component for a logging tool during a calibration process, according to some embodiments. As noted above, each transmitter and receiver pair may be separated by a distance (d) and may constitute one or more channels. The same transmitter and receiver pair represents a different channel for each different frequency utilized by the pair. In FIG. 4, a flow 400 begins at block 402.

At block 402, a logging tool 102 may perform air-hang measurements on all transmitters and receivers. The air-hang measurements may determine all components for the multi-component tensor other than the cross component Zzx (or Zxz or both). At block 404, the logging tool 102 may acquire the Zxx component for each tilted transmitter and tilted receiver pair. At block 406, the logging tool 102 may interpolate the Zxx for each non-tilted transmitter and receiver pair. At block 410, which may be performed in parallel with any of blocks 402-406, the logging tool 102 may acquire the Zzz component for all transmitter and receiver pairs. At block 408, the logging tool 102 may use the interpolation result Zxx from block 406 as an estimate for calibrating the Zzx component in subsurface formation. The logging tool may perform similar operations to determine the Zxz component.

The flowcharts are provided to aid in understanding the illustrations and are not to be used to limit scope of the claims. The flowcharts depict example operations that may vary within the scope of the claims. Additional operations may be performed; fewer operations may be performed; the operations may be performed in parallel, and the operations may be performed in a different order. For example, at least some of the operations depicted in FIG. 4 may be performed in parallel or concurrently.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations may be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. In the context of this document, a machine-readable storage medium may be any tangible medium that may contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that may communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object-oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that may direct a machine to function in a particular manner, such that the instructions stored in the machine-readable medium produce an article of manufacture including instructions which implement the function/act specified in the flowchart and/or block diagram block or blocks.

Example Computing Platform

Figure 5:
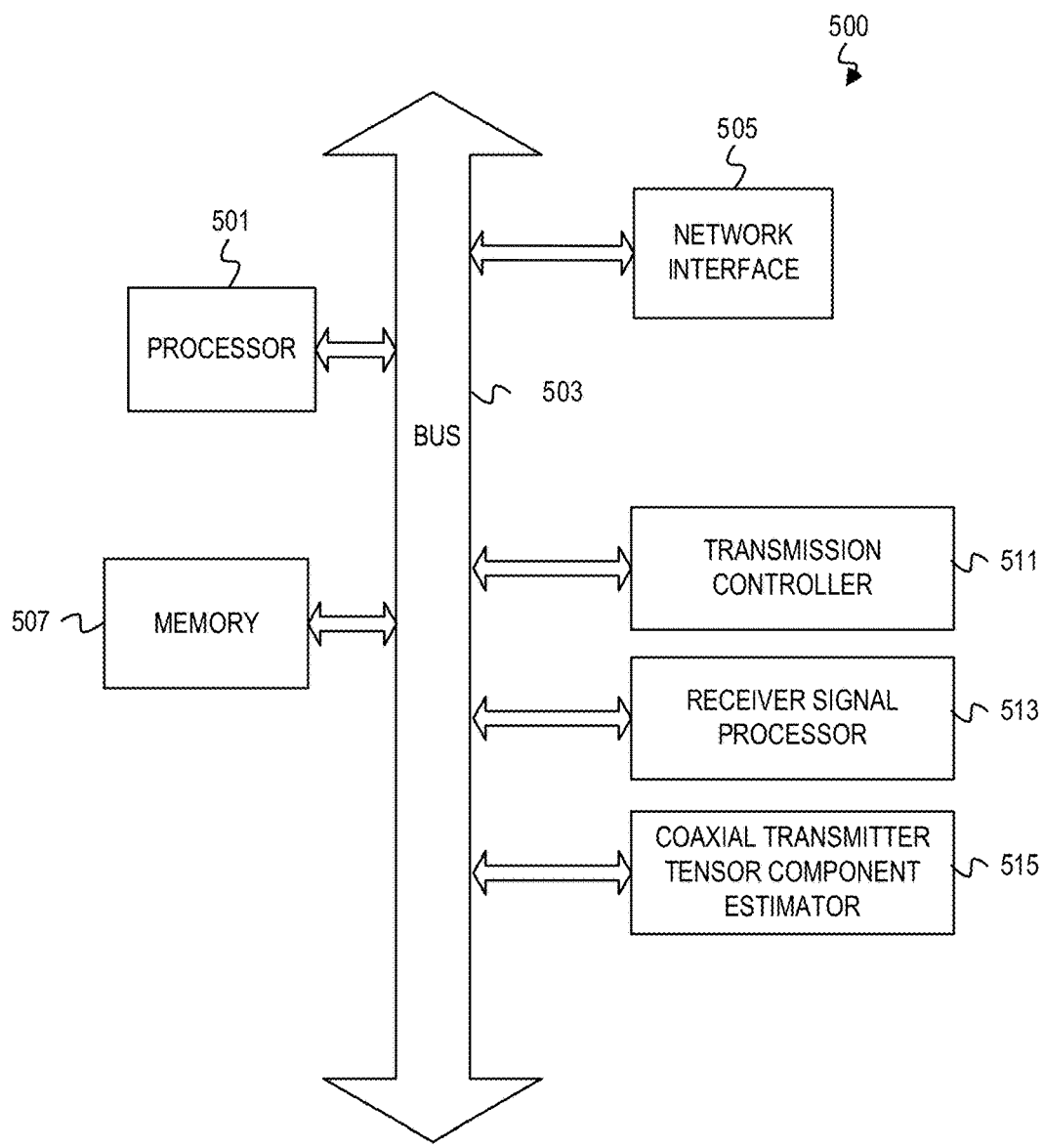
FIG. 5 depicts an example computer, according to some embodiments.

FIG. 5 depicts an example computer, according to some embodiments. A computer 500 may include one or more processors 501 (possibly including multiple cores, multiple nodes, and/or implementing multi-threading, etc.). The computer 500 may include a memory 507. The memory 507 may be system memory or any one or more of the above already described possible implementations of machine-readable media. The computer 500 also may include a bus 503 and a network interface 505. The computer 500 also may include a transmission controller 511 that may control signal transmissions, such as by the first coaxial transmitter 104 and second coaxial transmitter 106, as described herein. The computer 500 also may include a receiver signal processor 513 that may control receipt and processing of signals received by the first coaxial receiver 104 and the second coaxial receiver 106. The computer 500 also may include a coaxial transmitter tensor estimator 515 that may estimate one or more components of a tensor, as described herein. The functionality described herein may be implemented with an application-specific integrated circuit, in logic implemented in the processor 501, in a co-processor on a peripheral device or card, etc. Further, implementations may include fewer or additional components not illustrated in FIG. 5 (e.g., video cards, audio cards, additional network interfaces, peripheral devices, etc.). The processor 501 and the network interface 505 may be coupled to the bus 503. Although illustrated as being coupled to the bus 503, the memory 507 may be coupled to the processor 501. The computer 500 may be part of the logging tool 102, communicatively coupled with the logging tool 102, or otherwise utilized to achieved the functionality described herein.

Example Systems

Figure 6:
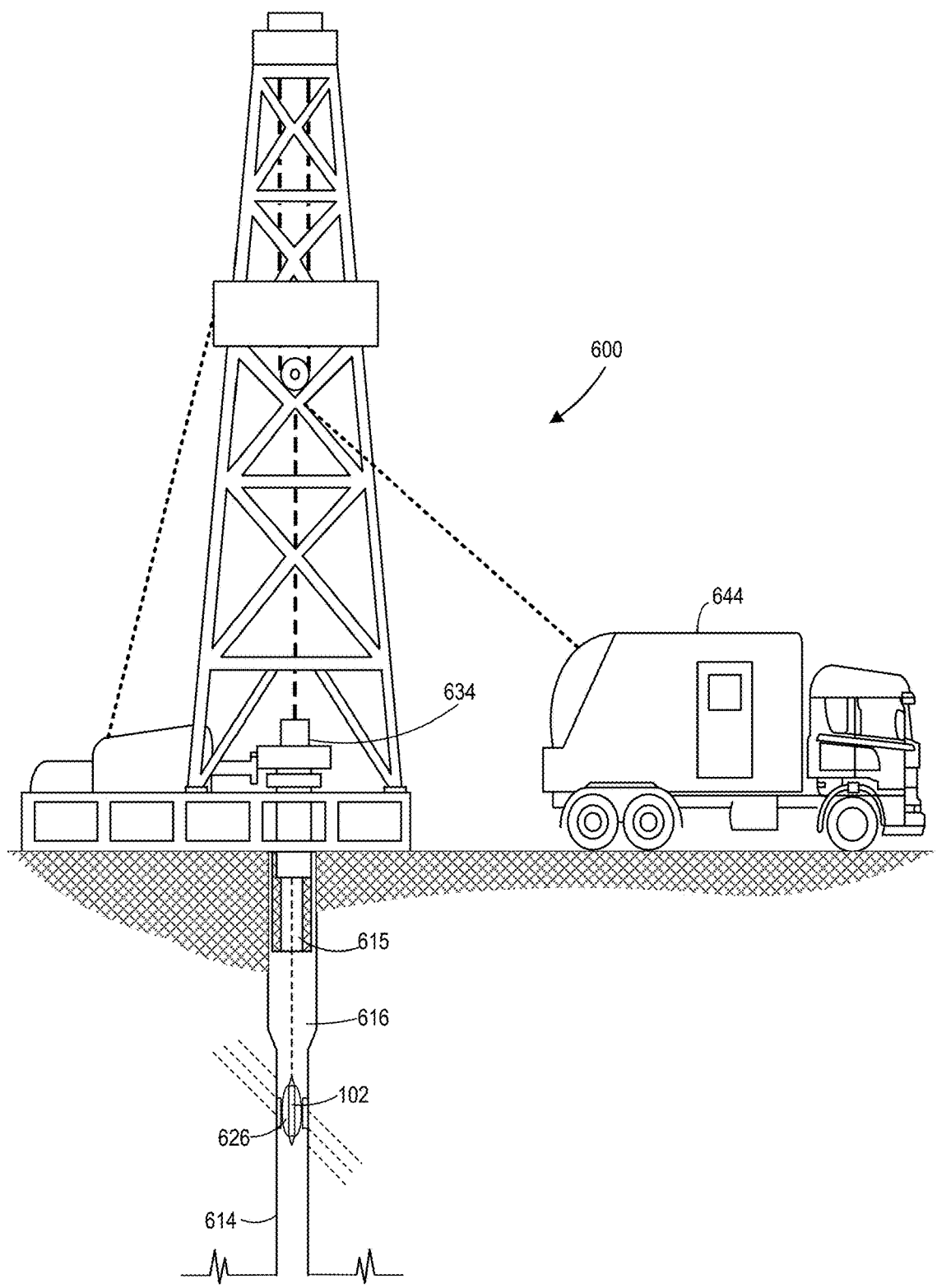
FIG. 6 depicts an example wireline system, according to some embodiments.

FIG. 6 depicts an example wireline system, according to some embodiments. A system 600 may be used in an illustrative logging environment with a drillstring removed, in accordance with some embodiments of the present disclosure.

Subterranean operations may be conducted using a wireline system 620 once the drillstring has been removed, though, at times, some or all of the drillstring may remain in a borehole 614 during logging with the wireline system 620. The wireline system 620 may include one or more logging tools 102 that may be suspended in the borehole 614 by a conveyance 616 (e.g., a cable, slickline, or coiled tubing). The logging tool 102 may be communicatively coupled to the conveyance 615. The conveyance 615 may contain conductors for transporting power to the wireline system 620 and telemetry from the logging tool 626 to a logging facility 644. The logging facility 644 may comprises an intermediate tensor-based calibrator capable enabling the logging tool 102 to utilize signal information without prior knowledge of antenna tilt-angles, as described herein. Alternatively, the conveyance 615 may lack a conductor, as is often the case using slickline or coiled tubing, and the wireline system 620 may contain a control unit 634 that contains memory, one or more batteries, and/or one or more processors for performing operations and storing measurements.

In certain implementations, the control unit 634 may be positioned at the surface, in the borehole (e.g., in the conveyance 615 and/or as part of the logging tool 102) or both (e.g., a portion of the processing may occur downhole and a portion may occur at the surface). The control unit 634 may include a control system or a control algorithm. In certain embodiments, a control system, an algorithm, or a set of machine-readable instructions may cause the control unit 634 to generate and provide an input signal to one or more elements of the logging tool 626, such as the sensors along the logging tool 102. The input signal may cause the sensors to be active or to output signals indicative of sensed properties. The logging facility 644 (shown in FIG. 6 as a truck, although it may be any other structure) may collect measurements from the logging tool 626, and may include computing facilities for controlling, processing, or storing the measurements gathered by the logging tool 102. The computing facilities may be communicatively coupled to the logging tool 102 by way of the conveyance 615 and may operate similarly to the control unit 634. In certain example embodiments, the control unit 634, which may be located in logging tool 102, may perform one or more functions of the computing facility.

The logging tool 102 may include a mandrel and a number of extendible arms coupled to the mandrel. One or more pads may be coupled to each of the extendible arms. Each of the pads may have a surface facing radially outward from the mandrel. Additionally, at least a sensor may be disposed on the surface of each pad. During operation, the extendible arms may be extended outwards to a wall of the borehole to extend the surface of the pads outward against the wall of the borehole. The sensors of the pads of each extendible arm may detect image data to create captured images of the formation surrounding the borehole.

Figure 7:
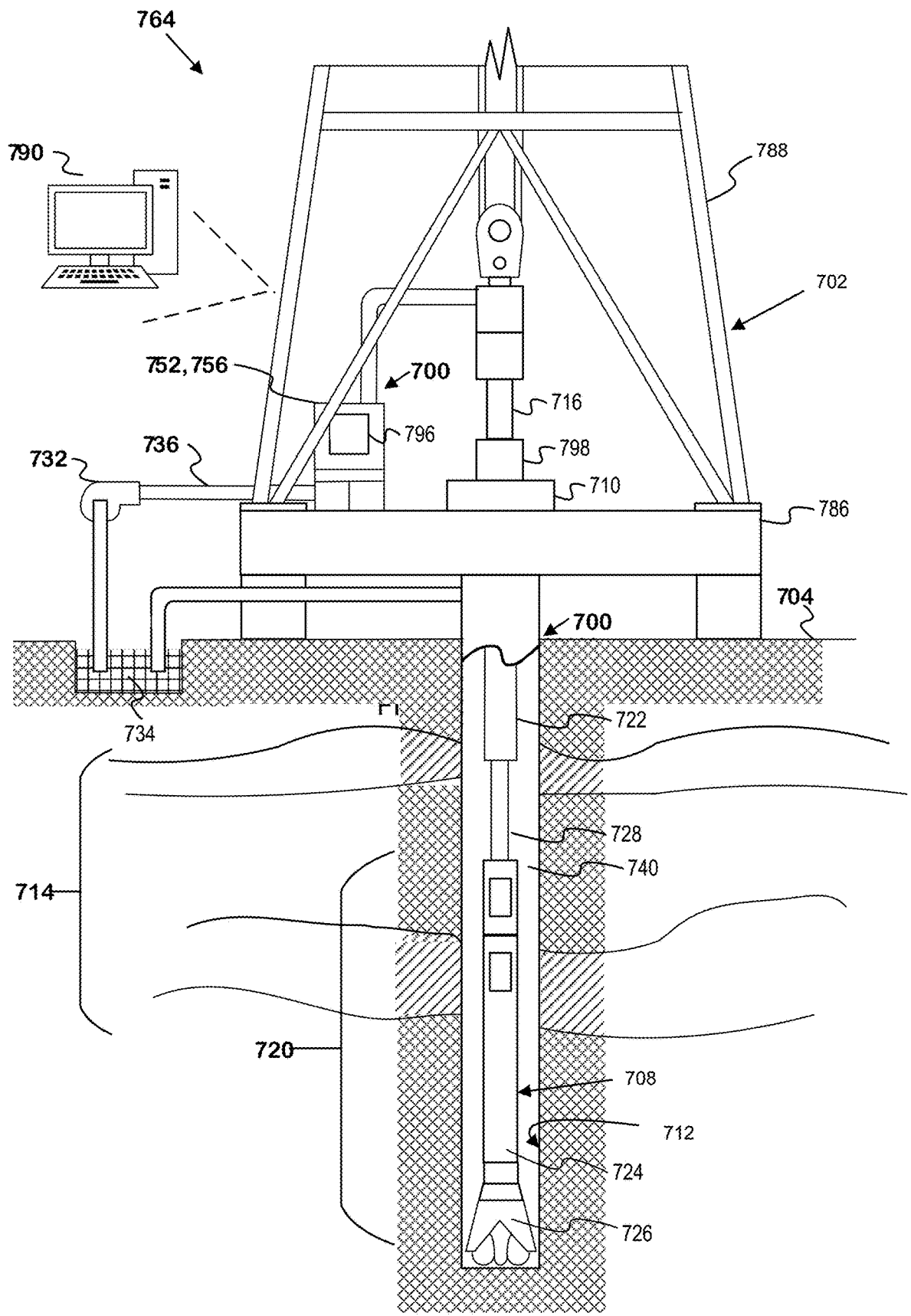
FIG. 7 depicts an example drilling rig system, according to some embodiments.

FIG. 7 is an example drilling rig system, according to some embodiments. For example, in FIG. 7 it can be seen how a system 764 may also form a portion of a drilling rig 702 located at the surface 704 of a well 706. Drilling of oil and gas wells is commonly carried out using a string of drill pipes connected together so as to form a drilling string 708 that may be lowered through a rotary table 710 into a wellbore or borehole 712. Here a drilling platform 786 may be equipped with a derrick 788 that supports a hoist. A computer 790 (e.g., similar to the computer 500) may be communicatively coupled to any measurement devices attached to the system 764 and may configured the system 764 to utilize signal information without prior knowledge of antenna tilt-angles, as described herein.

The drilling rig 702 may thus provide support for the drill string 708. The drill string 708 may operate to penetrate the rotary table 710 for drilling the borehole 712 through subsurface formations 714. The drill string 708 may include a Kelly 716, drill pipe 718, and a bottom hole assembly 720, perhaps located at the lower portion of the drill pipe 718.

The bottom hole assembly 720 may include drill collars 722, a down hole tool 724, and a drill bit 726. The drill bit 726 may operate to create a borehole 712 by penetrating the surface 704 and subsurface formations 714. The down hole tool 724 (e.g., similar to the logging tool 102) may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 710. In addition to, or alternatively, the bottom hole assembly 720 may also be rotated by a motor (e.g., a mud motor) that may be located down hole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid may flow out from the drill bit 726 and be returned to the surface 704 through an annular area 740 between the drill pipe 718 and the sides of the borehole 712. The drilling fluid may then be returned to the mud pit 734, where such fluid may be filtered. In some embodiments, the drilling fluid may be used to cool the drill bit 726, as well as to provide lubrication for the drill bit 726 during drilling operations. Additionally, the drilling fluid may be used to remove subsurface formation 714 cuttings created by operating the drill bit 726. It may be the images of these cuttings that many implementations operate to acquire and process.

Additional Example Operations

Figure 8:
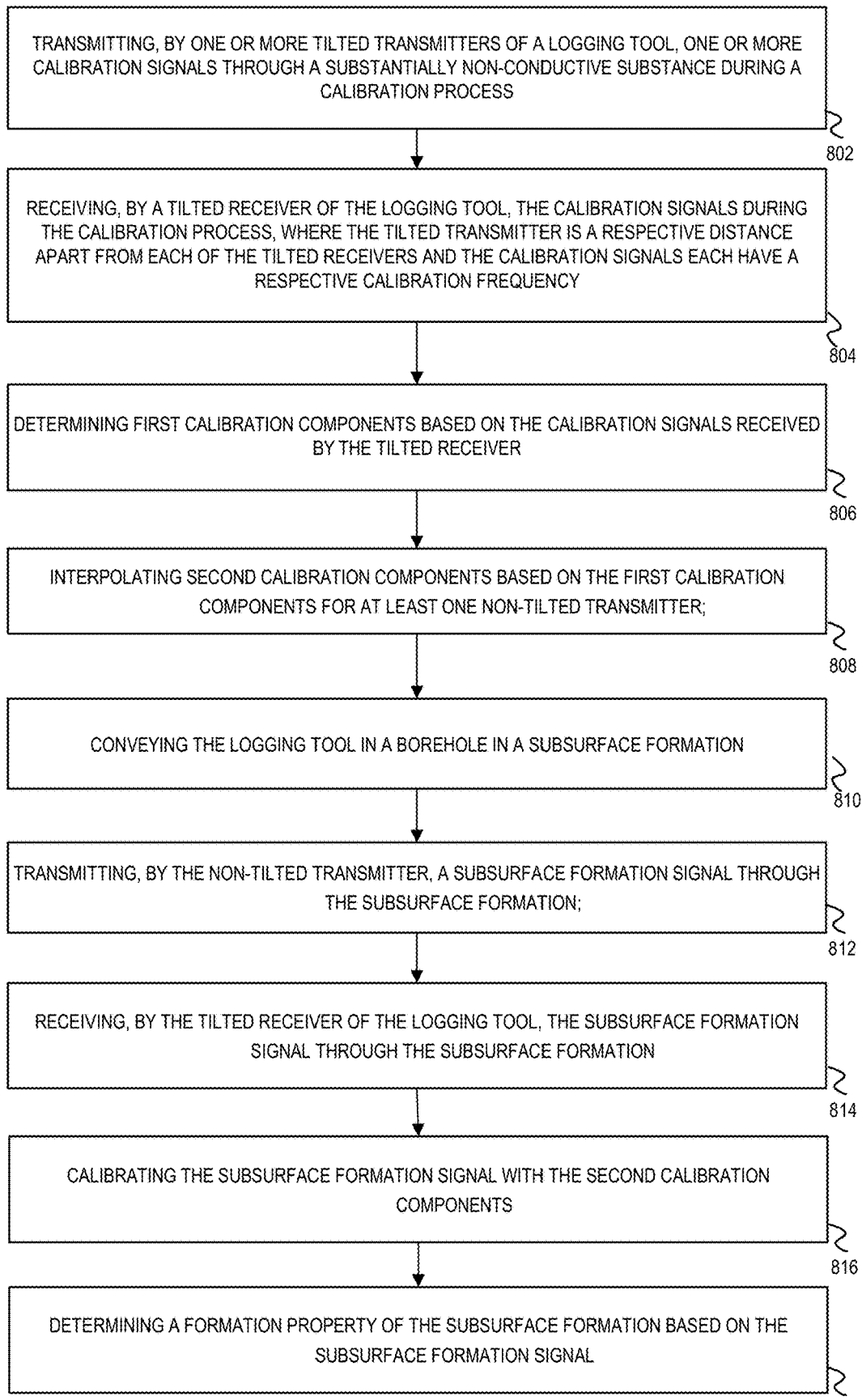
FIG. 8 depicts a flowchart illustrating example operations for estimating a multi-tensor component, according to some embodiments.

FIG. 8 depicts a flowchart illustrating example operations for estimating a multi-tensor component, according to some embodiments. At block 802, one or more tilted transmitters of a logging tool may transmit one or more calibration signals through a substantially non-conductive substance during a calibration process. At block 804, a tilted receiver of the logging tool may receive the calibration signals during the calibration process, where the tilted transmitter is a respective distance apart from each of the tilt and receivers and the calibration signals each have a respective calibration frequency. At block 806, the logging tool may determine first calibration components based on the calibration signals received by the tilted receiver. At block 808, the logging tool may interpolate second calibration components based on the first calibration components for at least one non-tilted transmitter. At block 810, the logging tool may be conveyed in a borehole in a subsurface formation. At block 812, the non-tilted transmitter may transmit a subsurface formation signal through the subsurface formation. At block 814, the tilted receiver of the logging tool may receive the subsurface formation signal through the subsurface formation. At block 816, the logging tool may calibrate the subsurface formation signal with the second calibration components. At block 820, the logging tool (or other component) may determine a formation property of the subsurface formation based on subsurface formation signal.

While the aspects of the disclosure are described with reference to various implementations and exploitations, it will be understood that these aspects are illustrative and that the scope of the claims is not limited to them. In general, techniques for reservoir modeling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C"

is satisfied by any element from the set {A, B, C} or any combination thereof, including multiples of any element.

Example Embodiments

Embodiment #1: A method comprising: transmitting, by one or more tilted transmitters of a logging tool, one or more calibration signals through a substantially non-conductive substance during a calibration process; receiving, by a tilted receiver of the logging tool, the calibration signals during the calibration process, wherein the tilted transmitter is a respective distance apart from each of the tilted receivers and the calibration signals each have a respective calibration frequency; determining first calibration components based on the calibration signals received by the tilted receiver; interpolating second calibration components based on the first calibration components for at least one non-tilted transmitter; conveying the logging tool in a borehole in a subsurface formation; transmitting, by the non-tilted transmitter, a subsurface formation signal through the subsurface formation; receiving, by the tilted receiver of the logging tool, the subsurface formation signal through the subsurface formation; calibrating the subsurface formation signal with the second calibration components; and determining a formation property of the subsurface formation based on the subsurface formation signal.

Embodiment #2: The method of Embodiment #1 further including: performing or updating a downhole operation based on the subsurface formation signal.

Embodiment #3: The method of any one or more of Embodiments #1-2, wherein interpolating second calibration components includes fitting the first calibration components to a curve and selecting points of the curve located at non-tilted transmitter.

Embodiment #4: The method of any one or more of Embodiments #1-3, wherein the curve is a mathematical function having an independent variable based on the respective distances and the respective frequencies, and a dependent variable indicating an amplitude or a phase.

Embodiment #5: The method of any one or more of Embodiments #1-4, wherein the second calibration components include Zxx components of a multi-component based on the curve.

Embodiment #6: The method of any one or more of Embodiments #1-5, wherein the first calibration components include Zxx components of a multi-component tensor.

Embodiment #7: The method of any one or more of Embodiments #1-6, wherein the substantially non-conductive substance is air.

Embodiment #8: A non-transitory, computer-readable medium having instructions stored thereon that are executable by a processor to cause the processor to: transmit, by one or more tilted transmitters of a logging tool, one or more calibration signals through a substantially non-conductive substance during a calibration process; receive, by a tilted receiver of the logging tool, the calibration signals during the calibration process, wherein the tilted transmitter is a respective distance apart from each of the tilted receivers and the calibration signals each have a respective calibration frequency; determine first calibration components based on the calibration signals received by the tilted receiver; interpolate second calibration components based on the first calibration components for at least one non-tilted transmitter; convey the logging tool in a borehole in a subsurface formation; transmit, by the non-tilted transmitter, a subsurface formation signal through the subsurface formation; receive, by the tilted receiver of the logging tool, the subsurface formation signal through the subsurface formation; calibrating the subsurface formation signal with the second calibration components; and determine a formation property of the subsurface formation based on the subsurface formation signal.

Embodiment #9: The computer-readable medium of Embodiment #8, wherein the instructions comprise instructions executable by the processor to cause the processor to, perform or update a downhole operation based on the subsurface formation signal.

Embodiment #10: The computer-readable medium of any one or more of Embodiments #8-9, wherein interpolation of the second calibration components includes fitment of the first calibration components to a curve and selection of points on the curve located at the non-tilted transmitter.

Embodiment #11: The computer-readable medium of any one or more of Embodiments #8-10, wherein the curve is a mathematical function having an independent variable based on the respective distances and the respective frequencies, and a dependent variable indicating an amplitude or a phase.

Embodiment #12: The computer-readable medium of any one or more of Embodiments #8-11, the substantially non-conductive substance is air.

Embodiment #13: The computer-readable medium of any one or more of Embodiments #8-12, wherein the second calibration components include Zxx components of a multi-component based on the curve.

Embodiment #14: The computer-readable medium of any one or more of Embodiments #8-13, wherein the first calibration components include Zxx components of a multi-component tensor.

Embodiment #15: A system comprising: a logging tool including one or more tilted transmitters configure to transmit one or more calibration signals through a substantially non-conductive substance during a calibration process, a tilted receiver configured to receive the calibration signals during the calibration process, wherein each tilted transmitter is a respective distance apart from each of the tilted receivers and the calibration signals each have a respective calibration frequency, a non-tilted transmitter configured to transmit a subsurface formation signal through a subsurface formation; a processor; and a machine-readable medium having instructions stored thereon that are executable by the processor to cause the processor to determine first calibration components based on the calibration signals received by the tilted receiver; interpolate second calibration components based on the first calibration components for at least one non-tilted transmitter; and calibrate a subsurface formation signal with the second calibration components.

Embodiment #16: The system of Embodiment #15, wherein the interpolation of the second calibration components includes fitment of the first calibration components to a curve and selection of points on the curve located at the non-tilted transmitter.

Embodiment #17: The system of any one or more of Embodiments #15-16, wherein the curve is a mathematical function having an independent variable based on the respective distances and the respective frequencies, and a dependent variable indicating an amplitude or phase.

Embodiment #18: The system of any one or more of Embodiments #15-17, wherein the substantially non-conductive substance is air.

Embodiment #19: The system of any one or more of Embodiments #15-18, wherein the third calibration components include Zxx components of a multi-component based on the curve.

Embodiment #20: The system of any one or more of Embodiments #15-19, wherein the first calibration components include Zxx components of a multi-component tensor.

What is claimed is:

1. A method comprising:
   transmitting, by one or more tilted transmitters of a logging tool, one or more calibration signals through a substantially non-conductive substance during a calibration process;
   receiving, by one or more tilted receivers of the logging tool, the calibration signals during the calibration process, wherein each of the one or more tilted transmitters are a respective distance apart from each of the one or more tilted receivers, and wherein the calibration signals each have a respective calibration frequency;
   determining first calibration components based on the calibration signals received by the one or more tilted receivers, wherein the first calibration components include first Zxx components of a first multi-component tensor;
   interpolating second calibration components based on the first calibration components for at least one non-tilted transmitter;
   conveying the logging tool in a borehole in a subsurface formation;
   transmitting, by the non-tilted transmitter, a subsurface formation signal through the subsurface formation;
   receiving, by at least one of the one or more tilted receivers of the logging tool, the subsurface formation signal through the subsurface formation;
   calibrating the subsurface formation signal with the second calibration components; and
   determining a formation property of the subsurface formation based on the subsurface formation signal.

2. The method of claim 1 further including:
   performing or updating a downhole operation based on the subsurface formation signal.

3. The method of claim 1, wherein interpolating the second calibration components includes fitting the first calibration components to a curve and selecting points of the curve located at the non-tilted transmitter.

4. The method of claim 3, wherein the curve is a mathematical function having an independent variable based on the respective distances and the respective calibration frequencies, and a dependent variable indicating an amplitude or a phase.

5. The method of claim 3, wherein the second calibration components include second $Z_{xx}$ components of a second multi-component tensor based on the curve.

6. The method of claim 1, wherein the substantially non-conductive substance is air.

7. A non-transitory, computer-readable medium having instructions stored thereon that are executable by a processor to cause the processor to:
   transmit, by one or more tilted transmitters of a logging tool, one or more calibration signals through a substantially non-conductive substance during a calibration process;
   receive, by one or more tilted receivers of the logging tool, the calibration signals during the calibration process, wherein each of the one or more tilted transmitters are a respective distance apart from each of the one or more tilted receivers, and wherein the calibration signals each have a respective calibration frequency;
   determine first calibration components based on the calibration signals received by the one or more tilted receivers, wherein the first calibration components include first Zxx components of a first multi-component tensor;
   interpolate second calibration components based on the first calibration components for at least one non-tilted transmitter;
   convey the logging tool in a borehole in a subsurface formation;
   transmit, by the non-tilted transmitter, a subsurface formation signal through the subsurface formation;
   receive, by at least one of the one or more tilted receivers of the logging tool, the subsurface formation signal through the subsurface formation;
   calibrating the subsurface formation signal with the second calibration components; and
   determine a formation property of the subsurface formation based on the subsurface formation signal.

8. The non-transitory, computer-readable medium of claim 7, wherein the instructions comprise instructions executable by the processor to cause the processor to, perform or update a downhole operation based on the subsurface formation signal.

9. The non-transitory, computer-readable medium of claim 7, wherein interpolation of the second calibration components includes fitment of the first calibration components to a curve and selection of points on the curve located at the non-tilted transmitter.

10. The non-transitory, computer-readable medium of claim 9, wherein the curve is a mathematical function having an independent variable based on the respective distances and the respective calibration frequencies, and a dependent variable indicating an amplitude or a phase.

11. The non-transitory, computer-readable medium of claim 9, wherein the second calibration components include second $Z_{xx}$ components of a second multi-component tensor based on the curve.

12. The non-transitory, computer-readable medium of claim 7, the substantially non-conductive substance is air.

13. A system comprising:
   a logging tool including
      one or more tilted transmitters configure to transmit one or more calibration signals through a substantially non-conductive substance during a calibration process,
      one or more tilted receivers configured to receive the calibration signals during the calibration process, wherein each of the one or more tilted transmitters are a respective distance apart from each of the one or more tilted receivers, and wherein the calibration signals each have a respective calibration frequency,
      a non-tilted transmitter configured to transmit a subsurface formation signal through a subsurface formation;
   a processor; and
   a machine-readable medium having instructions stored thereon that are executable by the processor to cause the processor to
      determine first calibration components based on the calibration signals received by at least one of the one or more tilted receivers, wherein the first calibration components include first Zxx components of a first multi-component tensor;
      interpolate second calibration components based on the first calibration components for at least one non-tilted transmitter; and
      calibrate the subsurface formation signal with the second calibration components.

14. The system of claim 13, wherein the interpolation of the second calibration components includes fitment of the first calibration components to a curve and selection of points on the curve located at the non-tilted transmitter.

15. The system of claim 14, wherein the curve is a mathematical function having an independent variable based on the respective distances and the respective calibration frequencies, and a dependent variable indicating an amplitude or phase.

16. The system of claim 13, wherein the second calibration components include second $Z_{xx}$ components of a second multi-component tensor.

17. The system of claim 13, wherein the substantially non-conductive substance is air.

\* \* \* \* \*